Figure 1B:
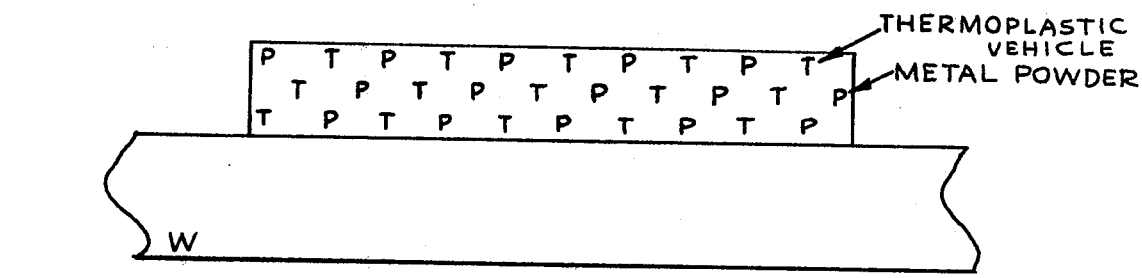
Figure 1B:
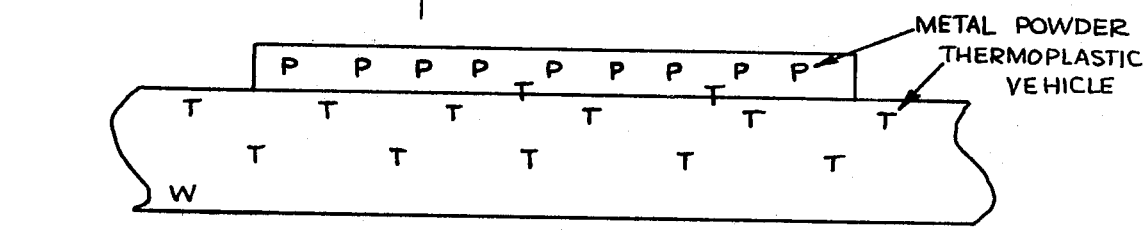

United States Patent [19]

Magrini et al.

[11] 4,243,710
[45] Jan. 6, 1981

[54] THERMOPLASTIC ELECTRODE INK FOR THE MANUFACTURE OF CERAMIC MULTI-LAYER CAPACITOR

[75] Inventors: Kenneth H. Magrini, Pittsburgh, Pa.; Raymond B. Jones, Bay Village, Ohio

[73] Assignee: Ferro Corporation, Cleveland, Ohio

[21] Appl. No.: 966,859

[22] Filed: Dec. 6, 1978

Related U.S. Application Data

[63] Continuation of Ser. No. 831,251, Sep. 9, 1977, abandoned.

[51] Int. Cl.³ .................. H01B 1/02; H01G 4/12; B05D 5/12
[52] U.S. Cl. .................. 428/208; 252/514; 361/313; 361/316; 427/123; 427/125; 427/269; 428/328; 428/432; 428/901
[58] Field of Search .................. 427/96, 123, 125, 269; 428/208, 432, 328, 901; 252/514; 361/313, 316

[56] References Cited

U.S. PATENT DOCUMENTS

| | | | |
|---|---|---|---|
| 2,682,480 | 6/1959 | Andrews | 427/282 |
| 2,694,016 | 11/1954 | Craven | 427/79 |
| 2,819,170 | 1/1958 | Short | 106/48 |
| 3,052,573 | 9/1962 | Dumesnil | 252/514 |
| 3,089,782 | 5/1963 | Bush et al. | 427/269 |
| 3,639,310 | 2/1972 | Andrews | 260/17 R |
| 3,817,758 | 6/1974 | Short | 252/514 X |
| 3,838,071 | 9/1974 | Amin | 252/514 |
| 3,903,344 | 9/1975 | Laiming | 428/213 |
| 3,935,366 | 1/1976 | Smith | 428/434 X |
| 3,978,248 | 8/1976 | Usami | 427/96 |
| 4,060,663 | 11/1977 | Merz | 428/328 X |
| 4,070,517 | 1/1978 | Kazmierowicz | 428/901 X |
| 4,070,518 | 1/1978 | Hoffman | 428/901 X |
| 4,072,780 | 2/1978 | Zillman | 428/901 |
| 4,109,377 | 8/1978 | Blazick et al. | 427/96 X |

*Primary Examiner*—Harold Ansher
*Attorney, Agent, or Firm*—Baldwin, Egan, Walling & Fetzer

[57] ABSTRACT

A ceramic multi-layer capacitor which uses specifically formulated electrode inks comprising a mixture of thermoplastic vehicles in combination with finely divided metal powders. The resultant thermoplastic electrode ink can be screen printed onto dielectric ware and immediately laminated, without a drying step. Multi-layer designs may be 50 or more layers wherein the thermoplastic components volatize at an appropriate time/temperature schedule to prevent slumping or delamination and to be chemically compatible with the organic binder components in the dielectric ware.

4 Claims, 3 Drawing Figures

DIELECTRIC WARE

Fig. 1-A

DIELECTRIC WARE

THERMOPLASTIC ELECTRODE INK FOR THE MANUFACTURE OF CERAMIC MULTI-LAYER CAPACITOR

This is a continuation, of application Ser. No. 831,251, filed Sept. 9, 1977, now abandoned.

This application relates to the materials and techniques used to manufacture ceramic multi-layer chip capacitors. More specifically, it relates to a new type of electrode ink and its effect on the overall manufacturing process.

Currently, capacitors are manufactured by screen printing techniques which include the use of an ink composition that is liquid at room temperature and which is screen printed onto a dielectric base on substrate. This technique requires subsequent drying periods oftentimes at elevated temperature (above room temperature 75° F.) for extended periods of time, as for example 4–24 hours.

Examples of this printing technique are illustrated in the following U.S. Pat. Nos. of E. I. du Pont de Nemours and Company: 2,694,016 issued Nov. 9, 1954; 2,819,170 issued Jan. 7, 1958; 2,822,279 issued Feb. 4, 1958; 2,924,540 issued Feb. 9, 1960; 3,052,573 issued Sept. 4, 1962; 3,089,782 issued May 14, 1963; 3,207,706 issued Sept. 21, 1965; 3,232,886 issued Feb. 1, 1966; 3,390,981 issued July 2, 1968; 3,586,522 issued June 22, 1971; 3,620,714 issued Nov. 16, 1971; 3,652.71; 3,652,332 issued Mar. 28, 1972; 3,674,515 issued July 4, 1972; 3,770,496 issued Nov. 6, 1973; 3,817,758 issued June 18, 1974; and 3,838,071 issued Sept. 24, 1974.

In contrast to this procedure, the present invention incorporates the use of specifically formulated electrode inks using thermoplastic vehicles in combination with finely divided metal powders. The resultant thermoplastic electrode ink can be screen printed onto the dielectric ware and immediately laminated, without a drying step.

Not all thermoplastic materials are suitable for use to produce inks for multi-layer ceramic capacitors. Multilayer designs are frequently 50 or more layers, therefore the thermoplastic components must volatize at an appropriate time/temperature schedule as to not cause slumping or delamination, and must be chemically compatible with the organic binder components in the dielectric ware.

The assignee of the present application has heretofore utilized a thermoplastic vehicle for the application of colors to ceramic and porcelain enamels. In this prior application, a mixture of finely divided glass frit and metallic oxides have been dispersed in the thermoplastic vehicle. This prior concept is discussed in further detail in U.S. Pat. No. 3,089,782 which issued on May 14, 1963 to the assignee.

The assignee has also recently utilized thermoplastic vehicles for use in thick film inks for manufacturing printed circuits and components thereof such as conductors and resistors.

An additional prior art development is also disclosed in U.S. Pat. No. 2,694,016 which issued on Nov. 9, 1954 which discloses thermoplastic vehicles for use in ceramic disc-type capacitors. Generally, it has been found that the mediums disclosed in this prior patent cause delamination upon firing the article when incorporated for use in multi-layer capacitor structures.

As mentioned earlier the volatilization rate and chemical compatibility with the binder in the dielectric ware are essential to produce an acceptable thermoplastic electrode ink. Once the electrode is screen printed onto the dielectric ware the vehicle portion of the ink when heated, diffuses throughout the ware matrix. The ware essentially is acting as a "blotter" and filters the vehicle through its structure.

This concept will be better understood by reference to the drawings of FIGS. 1A and 1B wherein said concept is schematically illustrated.

As is seen in FIGS. 1A and 1B, the dielectric ware is identified by the reference W.

Figure 2:
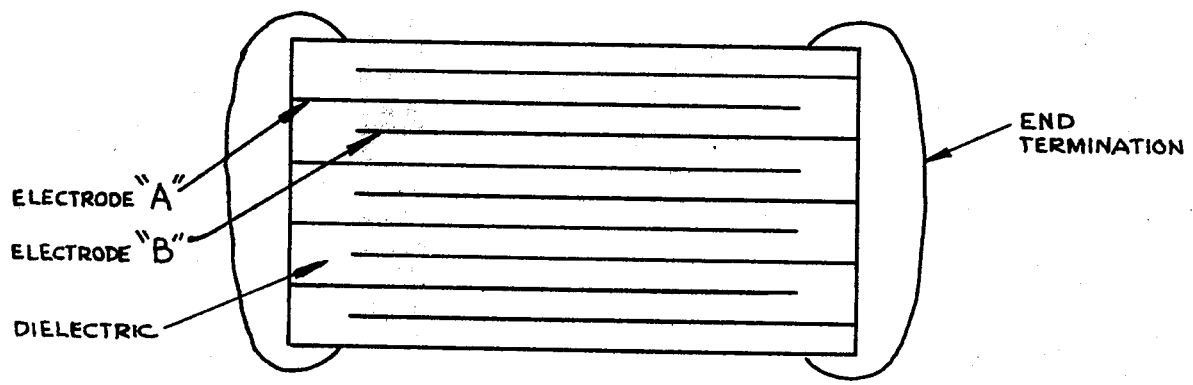

FIG. 2 is a schematic illustration of a multi-layer capacitor following the technology of the present invention.

The ink composition comprising the thermoplastic vehicle T and metallic powders P is screen printed into a specific electrode pattern onto the surface of dielectric ware W.

Dielectric ware W is composed of a suitable dielectric material such as barium titanate cast into a thin tape which may be, for example, 2 mil in thickness. This material also includes a binder constituent consisting of a suitable resin, as for example polyvinyl acetate which is intended to be compatible with the thermoplastic vehicle component in the ink composition.

The dielectric ware W may be composed by weight of 92% dielectric powder, such as barium titanate and 8% binders such as polyvinyl acetate.

The ink composition is composed of a combination of three organic materials classified as solvents, binders and modifiers.

The following chart lists the various combinations of the thermoplastic mediums which have been successfully used in the making of the ink composition of this invention.

Finely divided metal powders are used with any of the thermoplastic mediums identified in Chart I to produce these thermoplastic electrode inks. The metal powders have been either ternary, Ag/Pt/Pd systems, Pt/Pd/Au or binary, Ag/Pd systems. These are blended with these vehicles at a variety of weight percents. Examples of such electrode inks are as follows:

| MATERIAL | Weight % | | | |
| --- | --- | --- | --- | --- |
| | A | B | C | D |
| 20Pt/20Pd/60Au | 40.0 | 50.0 | 60.0 | 70.0 |
| EX 1 (CHI) | 60.0 | 33.5 | 13.3 | |
| EX 2 (CHI) | | 16.5 | 26.7 | 30.0 |
| | 100.0 | 100.0 | 100.0 | 100.0 |

In the instant use of the thermoplastic media a number of requirements must be achieved thereby to be an acceptable component for the manufacture of multi-layered ceramic capacitors. It must:

1. Be a solid at room temperature.
2. Have thermally controllable rheological screening properties.
3. Be capable of wetting the surface and holding in suspension the finely divided metal powders at screen printing temperatures, 100° F.–250° F.
4. Be chemically compatible with the organic components in the binder portion of the dielectric ware.
5. Volatilize at an appropriate time/temperature schedule as to not cause slumping, or delaminations in the multi-layers.

6. Be plastic enough in the solid state as to not fracture after printing and laminating when the pressed bar is flexed or cut.

When all these requirements are met, it is possible to produce a thermoplastic ink that can be screen printed onto dielectric ware and laminated into a multi-layer bar without a drying stage. This bar then may be diced into unique chips and fired.

In the manufacture of a multi-layer capacitor structure utilizing the concepts of the present invention as are herein defined, and as illustrated in FIG. 2, the thermoplastic ink composition is prepared and screen printed onto the dielectric ware or substrate as illustrated in FIG. 1A.

The ware may then be subjected to a suitable source of heat, above the melting point of the selected thermoplastic medium whereupon the majority of the medium flows and diffuses into the ware matrix as illustrated in FIG. 1B. Because of having selected compatible solvents, binders and modifiers in the vehicle and the dielectric ware this diffusion is highly facilitated.

Thereafter the dielectric ware is stacked or laminated to form a bar as called in the art having multi-layers of alternating electrode patterns. Alternatively, the dielectric ware may be stacked or laminated prior to heating for diffusion which may be undertaken after the multi-layer bar has been assembled. This bar is then diced according to a predetermined specification to form "green" or unfired multi-layer chips which may be subjected to sufficient heat according to a predetermined firing schedule whereby the complete volatilization of the organic compounds of the medium is accomplished.

Thereafter, the alternating electrodes A and B of successive layers are terminated through appropriate metallic end terminals as shown in FIG. 2 to form a multi-layer capacitor.

What is claimed is:

1. A ceramic multi-layer capacitor comprising a plurality of layers of a dielectric substrate having an electrode ink composition diffused thereon, said ink composition consisting of a mixture of metal powders and a thermoplastic vehicle, said powders being a ternary system having a percentage by weight to the ink of 40 percent and which comprises a mixture of 20 parts platinum, 20 parts palladium and 60 parts gold, and wherein the percentage by weight of the vehicle to the ink is 60 percent and comprises a mixture of 68 parts cetyl alcohol, 18 parts spermaceti wax and 14 parts methacrylate resin.

2. A ceramic multi-layer capacitor comprising a plurality of layers of a dielectric substrate having an electrode ink composition diffused thereon, said ink composition consisting of a mixture of metal powders and a thermoplastic vehicle, said powders being a ternary system having a percentage by weight to the ink of 70 percent and which comprises a mixture of 20 parts platinum, 20 parts palladium and 60 parts gold, and wherein the percentage by weight of the vehicle to the ink is 30 percent and comprises a mixture of 73 parts stearyl alcohol, 20 parts methacrylate resin, 6 parts ethyl cellulose and 1 part alkyl phosphate.

3. A ceramic multi-layer capacitor comprising a plurality of layers of a dielectric substrate having an electrode ink composition diffused thereon, said ink composition consisting of a mixture of metal powders and a thermoplastic vehicle, said powders being a ternary system having a percentage by weight to the ink of 50 percent and which comprises a mixture of 20 parts platinum, 20 parts palladium and 60 parts gold, and wherein the percentage by weight of the vehicle to the ink is 50 percent and comprises a mixture of two thermoplastic materials wherein the percentage by weight of the first material to the total ink composition is 33.5 percent and the percentage by weight of the second material to the total ink composition is 16.5 percent, said first material consisting of 68 parts cetyl alcohol, 18 parts spermaceti wax and 14 parts methacrylate resin and said second material consisting of 73 parts stearyl alcohol, 20 parts methacrylate resin, 6 parts ethyl cellulose and 1 part alkyl phosphate.

4. A ceramic multi-layer capacitor comprising a plurality of layers of a dielectric substrate having an electrode ink composition diffused thereon, said ink composition consisting of a mixture of metal powders and a thermoplastic vehicle, said powders being a ternary system having a percentage by weight to the ink of 60 percent and which comprises a mixture of 20 parts platinum, 20 parts palladium and 60 parts gold, and wherein the percentage by weight of the vehicle to the ink is 40 percent and comprises a mixture of two thermoplastic materials wherein the percentage by weight of the first material to the total ink composition is 13.3 percent and the percentage by weight of the second material to the total ink composition is 26.7 percent, said first material consisting of 68 parts cetyl alcohol, 18 parts spermaceti wax and 14 parts methacrylate resin and said second material consisting of 73 parts stearyl alcohol, 20 parts methacrylate resin, 6 parts ethyl cellulose and 1 part alkyl phosphate.

* * * * *